United States Patent
Jeong et al.

(10) Patent No.: US 12,517,257 B2
(45) Date of Patent: Jan. 6, 2026

(54) LiDAR FREE SPACE DATA GENERATOR AND LiDAR SIGNAL PROCESSING METHOD USING MULTI-MODAL NOISE FILTERING SCHEME

(71) Applicants: Hyundai Motor Company, Seoul (KR); Kia Corporation, Seoul (KR)

(72) Inventors: Mu Gwan Jeong, Seoul (KR); Nam Gyun Kim, Seongnam-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 325 days.

(21) Appl. No.: 17/954,030

(22) Filed: Sep. 27, 2022

(65) Prior Publication Data
US 2023/0258813 A1    Aug. 17, 2023

(30) Foreign Application Priority Data
Feb. 15, 2022   (KR) .......................... 10-2022-0019435

(51) Int. Cl.
G01S 17/931    (2020.01)
G01S 7/497    (2006.01)
(Continued)

(52) U.S. Cl.
CPC ............ G01S 17/931 (2020.01); G01S 17/89 (2013.01); G06T 7/521 (2017.01); *G06T 2207/10028* (2013.01); *G06T 2207/30252* (2013.01)

(58) Field of Classification Search
CPC ........ G01S 17/931; G01S 17/89; G01S 7/497; G06T 7/521; G06T 2207/10028;
(Continued)

(56) References Cited

U.S. PATENT DOCUMENTS

| | | | |
|---|---|---|---|
| 10,029,804 B1* | 7/2018 | Chamberlain | ........... G08G 5/74 |
| 10,733,420 B2 | 8/2020 | Liu | |

(Continued)

FOREIGN PATENT DOCUMENTS

| | | | |
|---|---|---|---|
| JP | 6799169 B2 | 12/2020 | |
| KR | 20190043035 A * | 4/2019 | |

(Continued)

OTHER PUBLICATIONS

Park, K., et al., "Parking Space Detection Based on Camera and LIDAR Sensor Fusion", Journal of Korea Robotics Society, vol. 14, Issue 3, Aug. 30, 2019, pp. 170-178.

*Primary Examiner* — Harry Y Oh
(74) *Attorney, Agent, or Firm* — SLATER MATSIL, LLP

(57) ABSTRACT

An embodiment LiDAR free space data generator includes a point filter module configured to select input points in a region of interest of an autonomous parking system from a three-dimensional (3D) point cloud obtained from a LiDAR, a two-dimensional (2D) grid map generation module configured to perform 2D grid-wise point processing on the selected input points to generate a first occupied grid feature map, and a multi-modal noise filter module configured to perform grid-level noise filtering, grid-level downsampling, or point-level noise filtering on the first occupied grid feature map to generate first LiDAR free space data.

20 Claims, 15 Drawing Sheets occupied grid feature map I occupied grid feature map II

(51) Int. Cl.
    *G01S 17/89*       (2020.01)
    *G06T 3/40*        (2024.01)
    *G06T 5/70*        (2024.01)
    *G06T 7/521*      (2017.01)
    *G06T 7/73*        (2017.01)

(58) Field of Classification Search
    CPC . G06T 2207/30252; G06T 2207/10016; G06T 2207/30264; G06T 7/73; G06T 3/40; G06T 5/70
    See application file for complete search history.

(56) References Cited

U.S. PATENT DOCUMENTS

| | | | |
|---|---|---|---|
| 10,885,398 B2 | 1/2021 | Wang et al. | |
| 10,964,077 B2 | 3/2021 | Kim | |
| 2019/0004524 A1* | 1/2019 | Wang | B60W 60/001 |
| 2021/0122364 A1 | 4/2021 | Lee et al. | |
| 2021/0278852 A1* | 9/2021 | Urtasun | G06T 17/05 |
| 2021/0405197 A1* | 12/2021 | Lee | G01S 17/93 |

FOREIGN PATENT DOCUMENTS

| | | |
|---|---|---|
| KR | 20200082109 A | 7/2020 |
| KR | 20200094384 A | 8/2020 |
| KR | 20210050925 A | 5/2021 |
| KR | 20210111052 A | 9/2021 |

\* cited by examiner

Raw point data

Camera image

Before applying an embodiment of the present invention

After applying an embodiment of the present invention

ID AR FREE SPACE DATA GENERATOR AND LiDAR SIGNAL PROCESSING METHOD USING MULTI-MODAL NOISE FILTERING SCHEME

CROSS-REFERENCE TO RELATED APPLICATIONS

This application claims the benefit of Korean Patent Application No. 10-2022-0019435, filed on Feb. 15, 2022, which application is hereby incorporated herein by reference.

TECHNICAL FIELD

The present invention relates to a LiDAR signal processing apparatus.

BACKGROUND

A smart car is a fusion vehicle that combines electric, electronic, and information and communication technologies with machine-oriented traditional automobile technology, and includes a field related to safety of autonomous driving and a field of connected cars. In particular, an intelligent vehicle, to which an advanced driver assistance system (ADAS) or autonomous driving is applied, collects and uses heterogeneous sensor data from various sensors installed to recognize a surrounding environment of a vehicle in motion. Here, the sensors include cameras, GPS, radar, and LiDAR.

An intelligent vehicle needs be able to ensure the safety of occupants, pedestrians, and surrounding vehicles and improve driving convenience by real-time monitoring of a situation around the vehicle with high accuracy through convergence of heterogeneous sensing data acquired from various sensors.

LiDAR is a sensor that recognizes a road environment around the vehicle in a three-dimensional (3D) shape by determining a shape of a target object along with information obtained by measuring a distance to a specific target using laser, and may be used in various vehicle-linked recognition systems, such as obstacle recognition and dynamic object tracking.

In general, a vehicle is equipped with a camera for acquiring image information around the vehicle, such as a black box, and when image information acquired by such a camera and sensor information in the form of a point cloud acquired by LiDAR are fused, the intelligent vehicle may be able to more efficiently detect a road environment around the vehicle, especially a parking environment in a parking lot.

A point cloud refers to a set of data in a coordinate system, is defined x, y, and z coordinates in a 3D coordinate system, and mostly indicates an outer surface of an object. Such a point cloud may be generated by a 3D LiDAR sensor.

In the conventional technology, a received LiDAR point cloud is processed using a 2D pointwise point processing scheme, which is effective in terms of accuracy. However, in order to process a large amount of LiDAR point cloud data in real time, a processor having a fast data processing speed is required.

In addition, even though pointwise point processing generates accurate LiDAR-based input data, there is a disadvantage that a separate noise removal device is required since a noise component is included in the generated LiDAR-based input data.

Republic of Korea Patent Publication No 10-2019-0043035 (Apr. 25, 2019) may provide information related to the background art.

SUMMARY

The present invention relates to a LiDAR signal processing apparatus. Particular embodiments relate to a LiDAR free space data generator and a LiDAR signal processing method capable of minimizing noise in generated LiDAR-based input data by applying a noise filtering scheme at a grid level and a point level to optimize determination of presence or absence of noise in a received LiDAR point.

Accordingly, embodiments of the present invention are directed to a LiDAR free space data generator and a LiDAR signal processing method using a multi-modal noise filtering scheme that substantially obviate one or more problems due to limitations and disadvantages of the related art.

An embodiment of the present invention provides a LiDAR free space data generator capable of minimizing noise in generated LiDAR-based input data by optimizing the determination of presence or absence of noise in a received LiDAR point by applying a noise filtering scheme at a grid level and a point level.

Another embodiment of the present invention provides a LiDAR signal processing method using a multi-modal noise filtering scheme capable of minimizing noise in generated LiDAR-based input data by optimizing the determination of presence or absence of noise in a received LiDAR point by applying a noise filtering scheme at a grid level and a point level.

Additional advantages, objects, and features of embodiments of the invention will be set forth in part in the description which follows and in part will become apparent to those having ordinary skill in the art upon examination of the following or may be learned from practice of the invention. The objectives and other advantages of embodiments of the invention may be realized and attained by the structure particularly pointed out in the written description and claims hereof as well as the appended drawings.

In accordance with an embodiment of the invention, a LiDAR free space data generator removes noise included in data of a point cloud to generate first LiDAR free space data, and includes a point filter module, a 2D grid map generation module, and a multi-modal noise filter module. The point filter module selects, as input points, points present in a region of interest (ROI) of an autonomous parking system in the point cloud. The 2D grid map generation module performs 2D grid-wise point processing on the selected input points to generate a first occupied grid feature map. The multi-modal noise filter module performs at least one of a grid level noise filter step, a grid level downsampling step, and a point level noise filter step on the first occupied grid feature map to generate the first LiDAR free space data.

In another embodiment of the present invention, a LiDAR signal processing method using a multi-modal noise filtering scheme removes noise included in data of a point cloud to generate first LiDAR free space data, and includes generating a first occupied grid feature map by selecting, as input points, points present in an ROI of an autonomous parking system in the point cloud, performing 2D grid-wise point processing on the selected input points, and generating the first LiDAR free space data by performing at least one of a grid level noise filter step, a grid level downsampling step, and a point level noise filter step on the first occupied grid feature map.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate embodiments of the invention and together with the description serve to explain a principle of embodiments of the invention. In the drawings.

DETAILED DESCRIPTION OF ILLUSTRATIVE EMBODIMENTS

Figure 1:
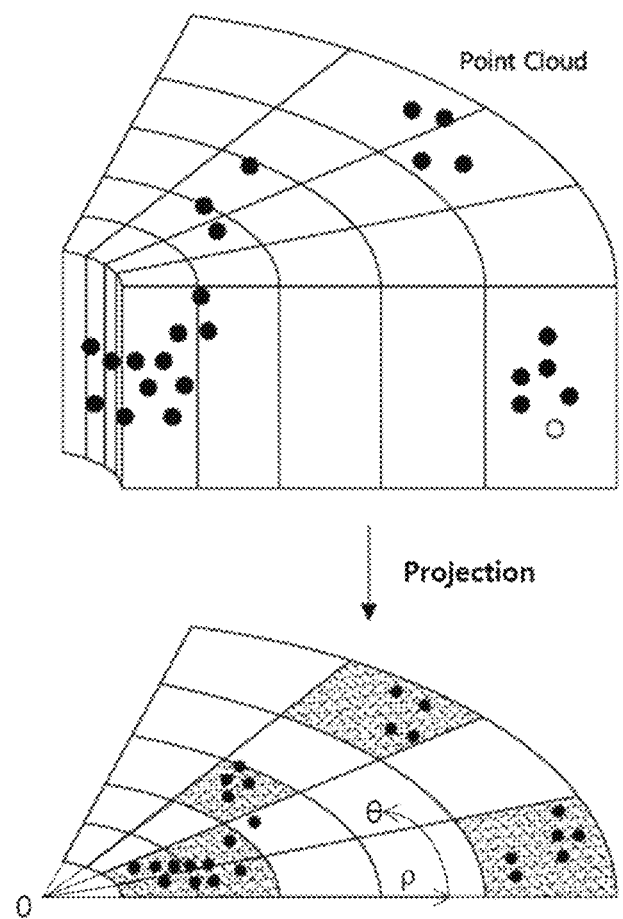
FIG. 1 describes a process of projecting a 3D point onto a 2D-form rectangular grid map.

In order to fully understand embodiments of the present invention, the operational advantages of embodiments of the present invention, and objects achievable by implementation of embodiments of the present invention, reference should be made to the accompanying drawings describing embodiments of the present invention and content described in the accompanying drawings.

Hereinafter, embodiments of the present invention will be described in detail by describing preferred embodiments of the present invention with reference to the accompanying drawings. Like reference numerals in each figure indicate like elements.

FIG. 1 illustrates an exemplary process of projecting a 3D point cloud onto a two-dimensional (2D) grid map in which the grids are defined on a rho($\rho$)-theta($\theta$) plane.

Referring to FIG. 1, since 3D LiDAR generates a significant amount of points in a surrounding region of a vehicle, efficient clustering may be required. For example, as shown in FIG. 1, a 3D point cloud may be projected onto a 2D grid map and transformed into 2D points, and clustering may be performed on the transformed 2D points on the grid map.

Figure 2:
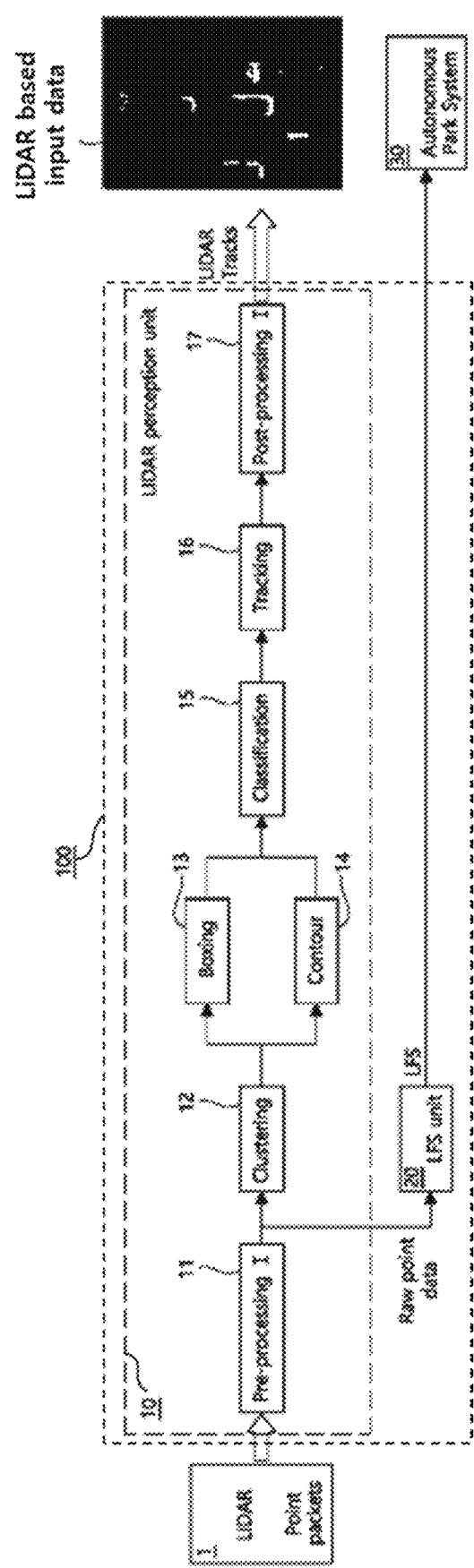
FIG. 2 is an embodiment of a LiDAR signal processing system using a multi-modal noise filtering scheme according to embodiments of the present invention.

FIG. 2 is an embodiment of a LiDAR signal processing system using a multi-modal noise filtering scheme according to embodiments of the present invention.

Referring to FIG. 2, a LiDAR signal processing system 100 may include a LiDAR perception unit 10 and a LiDAR free space unit 20 using a multi-modal noise filtering scheme and may assist an autonomous parking system 30 of a vehicle.

The LiDAR perception unit 10 may process a point cloud (point packets) received from a LiDAR 1 to generate LiDAR-based input data (LiDAR tracks), and may include a first preprocessing unit 11, a clustering unit 12, a boxing unit 13, a contour unit 14, a classification unit 15, a tracking unit 16, and a post-processing unit 17.

The clustering unit 12, after receiving the point cloud data from the LiDAR 1 pre-processed through the preprocessing unit 11, may create a grid map for points to be clustered, identify a relationship between adjacent grids to determine whether to group the grids into one cluster, and output the generated cluster accordingly. Operations of the boxing unit 13, the contour unit 14, the classification unit 15, the tracking unit 16, and the post-processing unit 17 are not the core idea of embodiments of the present invention, and a person skilled in the art can understand the function and operation thereof. Thus, a description is omitted here.

The LiDAR free space unit 20 using the multi-modal noise filtering scheme may generate LiDAR free space (LFS) data indicating free spaces which no object occupies after removing noise points included in the point cloud data (raw point data) received from the LiDAR 1, and may deliver the LFS data to the autonomous parking system 30.

FIG. 2 illustrates that the LiDAR free space unit 20 using the multi-modal noise filtering scheme receives output data (raw point data) of the first preprocessing unit 11 included in the LiDAR perception unit 10. However, it is possible to adopt an embodiment in which a signal (point packet) output from the LiDAR 1 is directly received.

Figure 3:
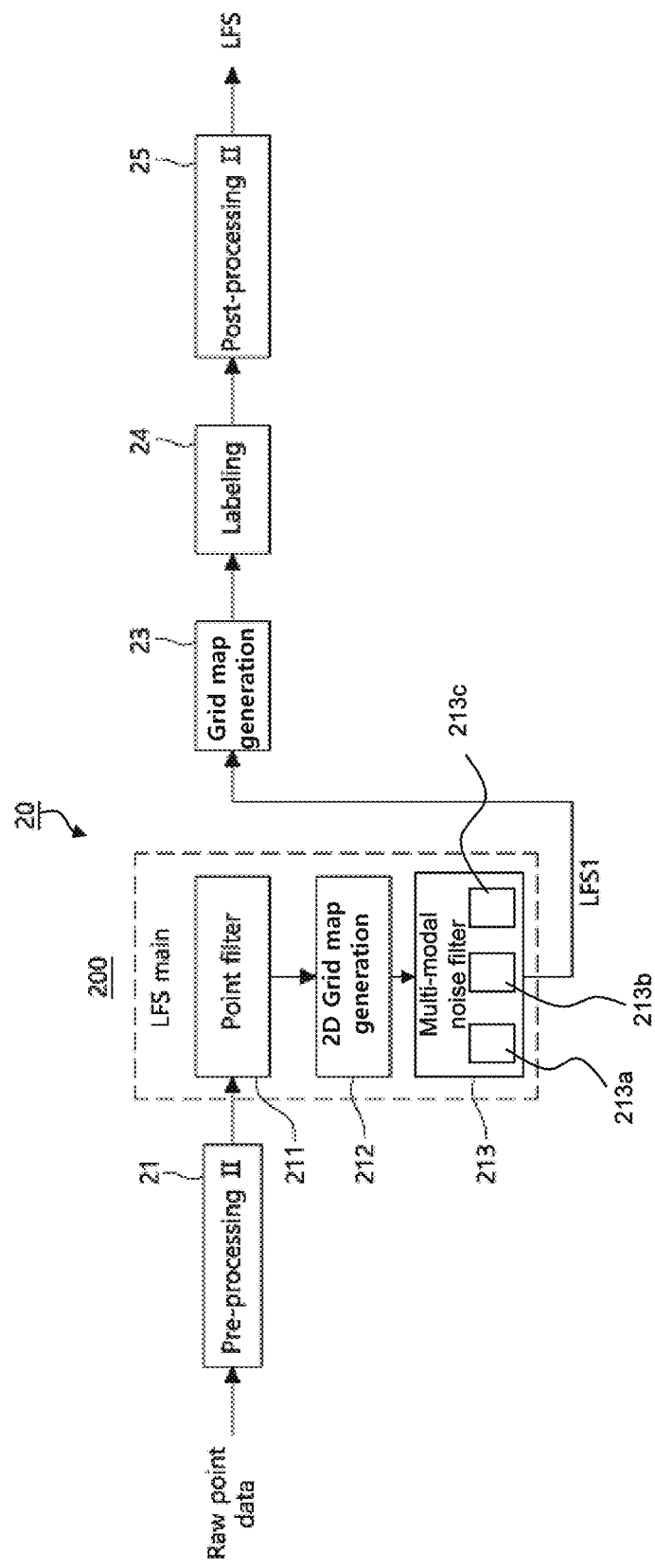
FIG. 3 is an embodiment of a LiDAR signal processing apparatus using the multi-modal noise filtering scheme according to embodiments of the present invention.

FIG. 3 is an embodiment of a LiDAR free space unit 20 using the multi-modal noise filtering scheme according to embodiments of the present invention.

Referring to FIG. 3, the LiDAR free space unit 20 using the multi-modal noise filtering scheme according to embodiments of the present invention may include a second preprocessing unit 21, a LiDAR free space data generator 200, a grid map generator 23, a labeling unit 24, and a second post-processing unit 25.

The second preprocessing unit 21 pre-processes the point cloud data (raw point data) received from the LiDAR 1. Here, preprocessing includes a process of performing calibration for transforming coordinates of the LiDAR points according to the coordinate system of the LiDAR 1 to coordinates according to a coordinate system (e.g., a $\rho$-$\theta$ coordinate system) of the vehicle, and removing points having low signal strength or reflectance and points reflected by the vehicle from the point cloud data.

Here, the angle is measured around the origin (e.g., a center point of a front bumper of the vehicle), and the origin refers to a central point of an ROI.

The LiDAR free space data generator 200 may include a point filter module 211 configured to remove noise included in the point cloud data pre-processed by the second preprocessing unit 21, and may further include a 2D grid map generation module 212 and a multi-modal noise filter module 213, and may output first LiDAR free space data (LFS1).

The point filter module 211 selects points present in an ROI of the autonomous parking system 30 from the point cloud in order to verify whether a space of the selected points belongs to a parking space, which is the ROI managed by the autonomous parking system 30, and selects, as input points, only points within a range between a first height and a second height from a ground level, the second height being higher than the first height. For example, the first height may be determined as a height over which a vehicle can pass (i.e., the ground clearance of the vehicle), and the second height may be determined as a height under which the vehicle can pass (i.e., the overhead clearance of the vehicle).

The 2D grid map generation module 212 may perform 2D grid-wise point processing on the selected input points received from the point filter module 211, thereby generating a first occupied grid feature map (occupied grid feature map I). In this instance, the 2D grids, as shown in FIG. 1, may be defined on the rho($\rho$)-theta($\theta$) coordinate system having the center point of the front bumper of the vehicle as the origin. The grids may have the same dimensions in the $\rho$ axis and the same angle span along the $\theta$ direction.

Each one of the grids in which one or more points are contained may have information on a number of its contained points, a maximum height and a minimum height of the contained point, a point closest to the origin, and a distance from the closest point to the origin.

The multi-modal noise filter module 213 may perform a grid level noise filtering process, a grid level downsampling process, and a level noise filtering process on the first occupied grid feature map (occupied grid feature map I), thereby generating first LiDAR free space data (LSF1). The grid level noise filtering process, the grid level downsampling process, and the point level noise filtering process will be described later.

The grid map generator 23 may generate a grid map using the first LiDAR free space data (LFS1). The labeling unit 24 may label the grid map generated by the grid map generator 23. The second post-processing unit 25 may post-process the grid map labeled by the labeling unit 24 to generate second LiDAR free space data (LFS). Post-processing is a process of obtaining final products such as a numerical elevation model (DEM), a numerical topographic model (DTM), a triangular irregular network (TIN), discontinuous lines, and contour lines, and includes filtering and pyramiding operations such as tiling, grading, and tree removal.

Hereinafter, a description will be given of a LiDAR signal processing method using the multi-modal noise filtering scheme, which uses the LiDAR signal processing system 100 using the multi-modal noise filtering scheme and the LiDAR free space unit 20 using the multi-modal noise filtering scheme illustrated in FIG. 2 and FIG. 3.

Figure 4:
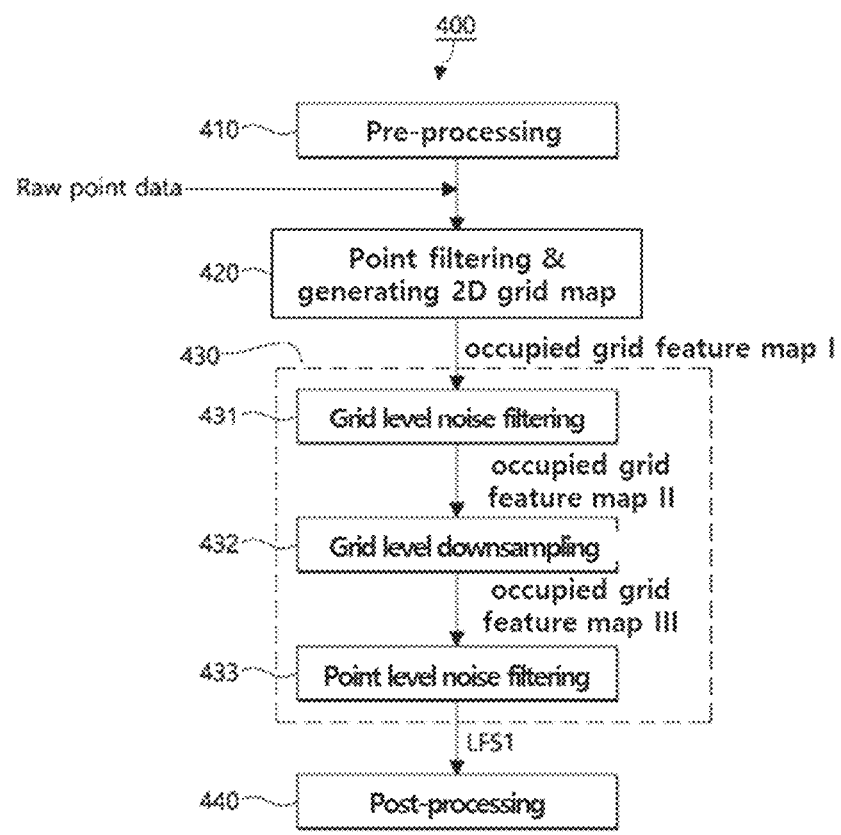
FIG. 4 is an embodiment of a LiDAR signal processing method using the multi-modal noise filtering scheme according to embodiments of the present invention.

FIG. 4 is an embodiment of the LiDAR signal processing method using the multi-modal noise filtering scheme.

Referring to FIG. 4, a LiDAR signal processing method 400 using the multi-modal noise filtering scheme according to embodiments of the present invention may include a preprocessing step 410, a point filtering and 2D grid map generation step 420, a multi-modal noise filtering step 430, and a post-processing step 440.

The preprocessing step 410 may be performed by the second preprocessing unit 21, and the post-processing step 440 may be performed by the second post-processing unit 25. Descriptions of functions performed are replaced with descriptions of the second preprocessing unit 21 and the second post-processing unit 25, respectively.

Figure 5:
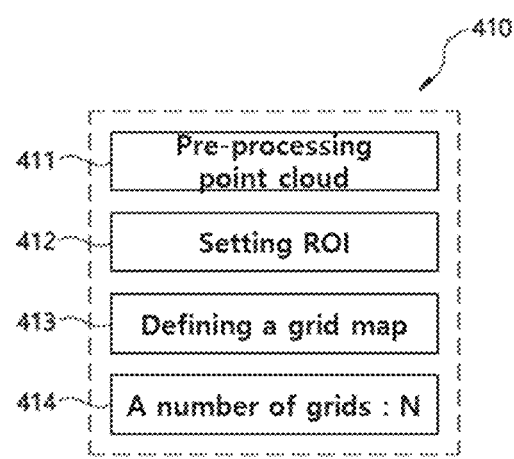
FIG. 5 is an embodiment of a process performed in a preprocessing step.

FIG. 5 is an embodiment of a process performed in the preprocessing step 410.

Referring to FIG. 5, in the preprocessing step 410, point cloud data may be pre-processed in step 411, an ROI may be set in step 412, a grid map may be defined in step 413, and the number of grids N (a natural number) may be set in step 414.

Description of the preprocessing 411 of the point cloud data may be replaced with the description of the function of the second preprocessing unit 21. Generally, the size of the ROI and the number of points selected as input points may be proportional, and thus as the size of the ROI increases, the number of points to be processed increases. Therefore, the size of the ROI needs to be adaptively determined in step 412 according to specification and control performance of the autonomous parking system 30. It is suggested that the shape of the grid of the grid map be radial as shown in FIG. 1, which is advantageous for clustering, in comparison with rectangular or square shaped grids. When the shapes of the ROI and grid map are determined in step 413, the number of grids included in the ROI may be determined in step 414.

The point filtering and 2D grid map generation step 420 may be performed by the point filter module 211 and the 2D grid map generation module 212.

Figure 6:
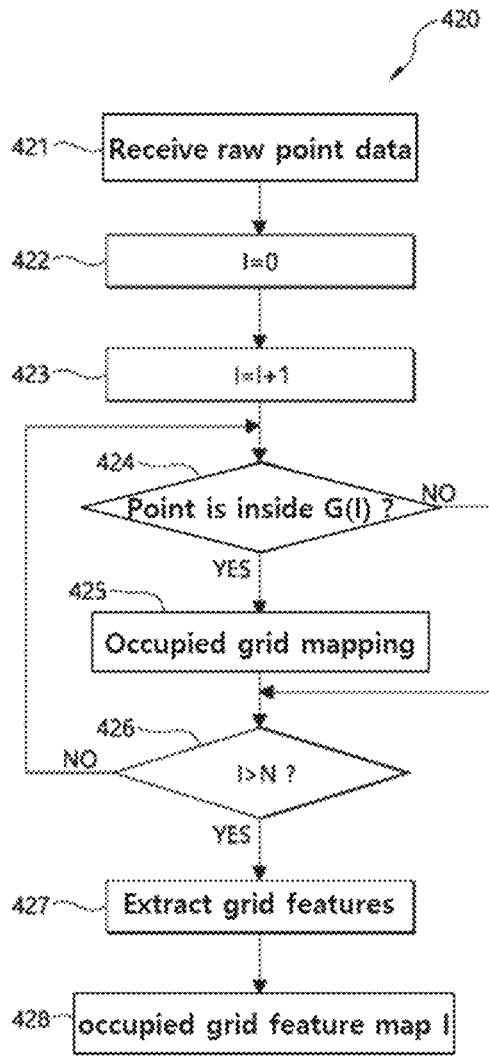
FIG. 6 is an embodiment of a point filtering and 2D grid map generation step.

FIG. 6 is an embodiment of the point filtering and 2D grid map generation step.

Referring to FIG. 6, the point filtering and 2D grid map generation step 420 may include step 421 of receiving point cloud data, steps 424 and 425 of mapping the point data onto an occupied grid map, step 427 of extracting features of the grids each of which is occupied by one or more points, and step 428 of generating a first occupied grid feature map (occupied grid feature map I).

Steps 422, 423, and 426 of comparing a variable I with the number of grids N (a natural number) and performing an operation on all grids in FIG. 6 are well known in the signal processing process, and thus will not be described in detail here. In the following description, in the description of FIGS. 8, 10, and 12, a description of the corresponding part will be omitted in the same manner as in FIG. 6.

In steps 424 and 425, only points belonging to the inside of a grid may be mapped to an occupied grid. In step 428 of generating the first occupied grid feature map (occupied grid feature map I), an operation may be performed on all grids to generate the first occupied grid feature map (occupied grid feature map I) including a grid in which at least one point is present.

In step 427, for each one of the grids in which one or more points are contained, grid features including a shape of the grid, an angle of the grid, a length of the grid in the rho direction, the number of points belonging thereto, a maximum height and a minimum height of the included points, a point closest to the origin, and a distance from the closest point to the origin on an x-y plane may be extracted. The extracted grid features are included in the first occupied grid feature map (occupied grid feature map I) in the subsequent step 428.

Figure 7:
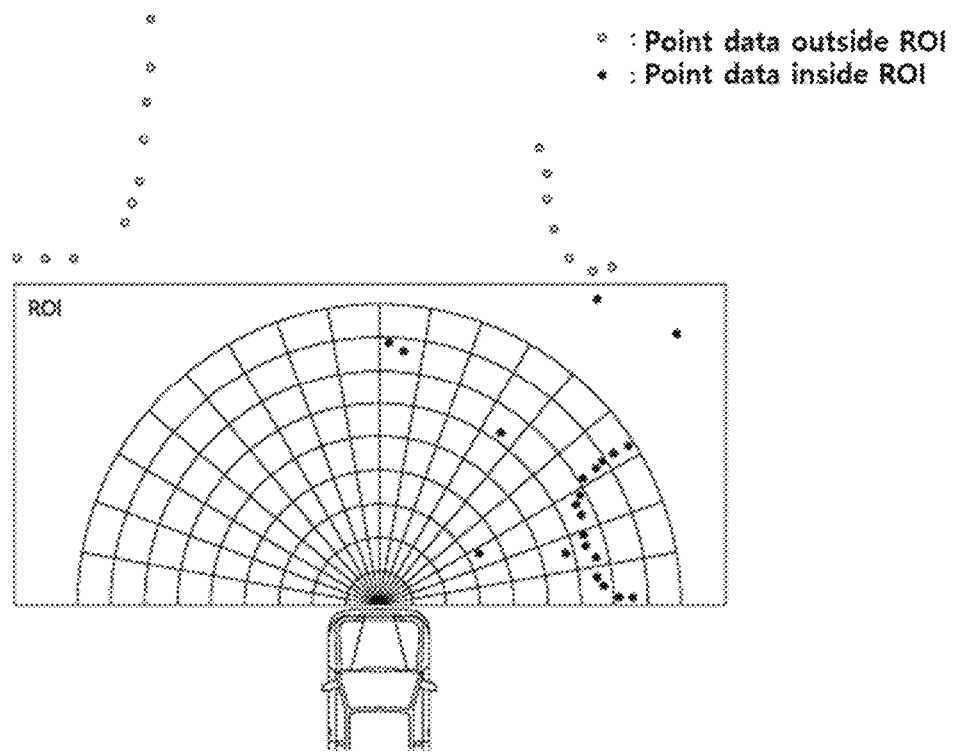
FIG. 7 is a result of implementation of the point filtering and 2D grid map generation step.

FIG. 7 is an exemplary result of implementation of the point filtering and 2D grid map generation step.

Referring to FIG. 7, among a plurality of points (•, ○), points (•) inside the ROI and points (○) outside the ROI are distinguished, and it can be seen that only the points (•) inside the ROI are mapped to the grids forming an occupied grid map.

The multi-modal noise filtering step 430 may include a grid level noise filtering step 431, a grid level downsampling step 432, and a point level noise filtering step 433 performed by the multi-modal noise filter module 213, and may process the first occupied grid feature map (occupied grid feature map I) generated by the point filtering and 2D grid map generation step 420 to generate first LiDAR free space data (LFS1).

The grid level noise filtering step 431, the grid level downsampling step 432, and the point level noise filtering step 433 illustrated in FIG. 4 may be performed by a device including a logic circuit and an arithmetic circuit for processing an input signal, such as a grid level noise filtering unit (213a), a grid level downsampling unit (213b), and a point level noise filtering unit (213C), and it may be possible to adopt an embodiment in which each function of the grid level noise filtering unit (213a), the grid level downsampling unit (213b), and the point level noise filtering unit (213c) is performed by a signal processing device.

Figure 8:
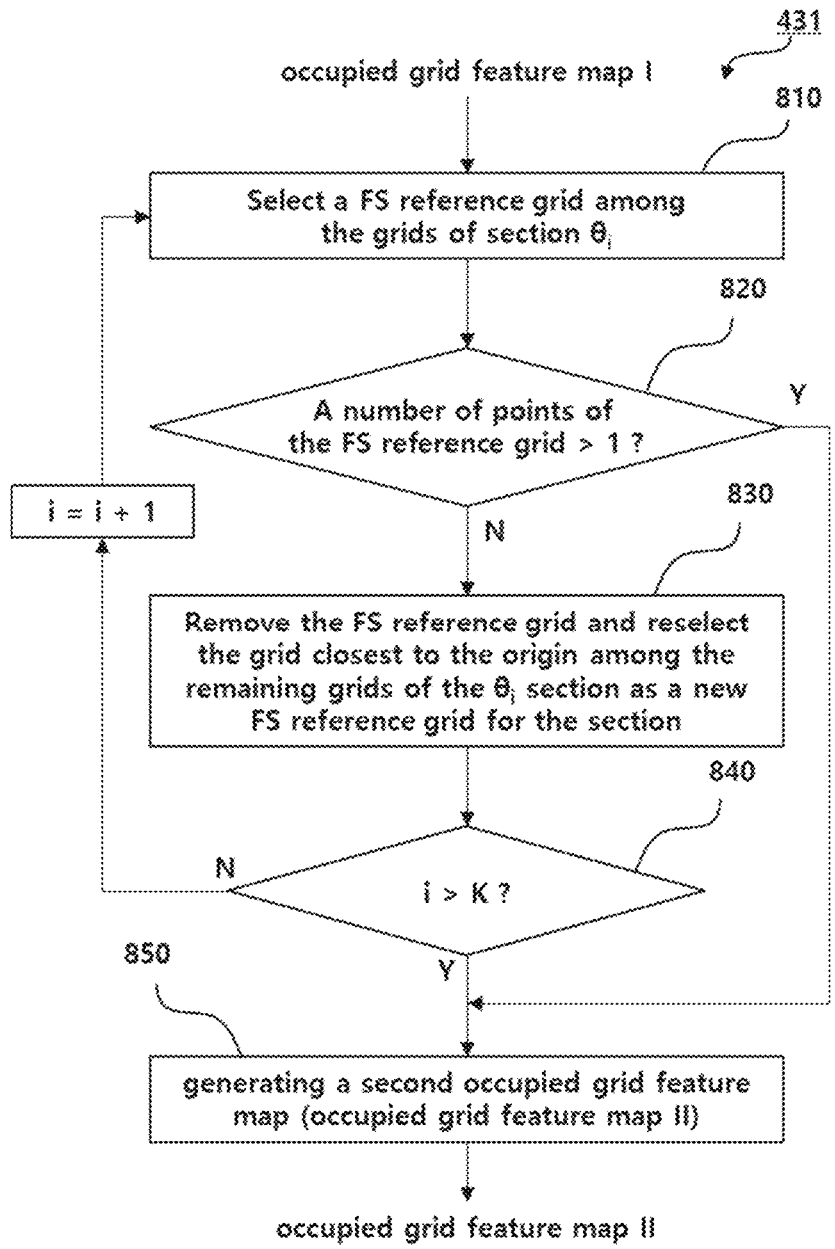
FIG. 8 is an embodiment of a grid level noise filtering step.

FIG. 8 is an exemplary embodiment of the grid level noise filtering step.

Referring to FIG. 8, the grid level noise filtering step 431 may remove a grid having one point therein from the occupied grids, i.e., the corresponding grid may become a free grid. To this end, the grid level noise filtering step 431 may include step 810 of selecting, among the grids of the same angle section whose grids are arranged along the p direction at the same angle location, a grid including a point having the smallest distance from the origin as a free space (FS) reference grid for each angle section in the received first occupied grid feature map (occupied grid feature map I), steps 820 and 830 of removing the free space reference grid which has one point and reselecting the grid closest to the origin as a new free space reference grid for the corresponding angle section (the steps 820 and 830 are repeated until the selection of the free space reference grids is completed for all the K sections), and step 850 of generating a second occupied grid feature map (occupied grid feature map II) including the free space reference grids.

Figure 9:
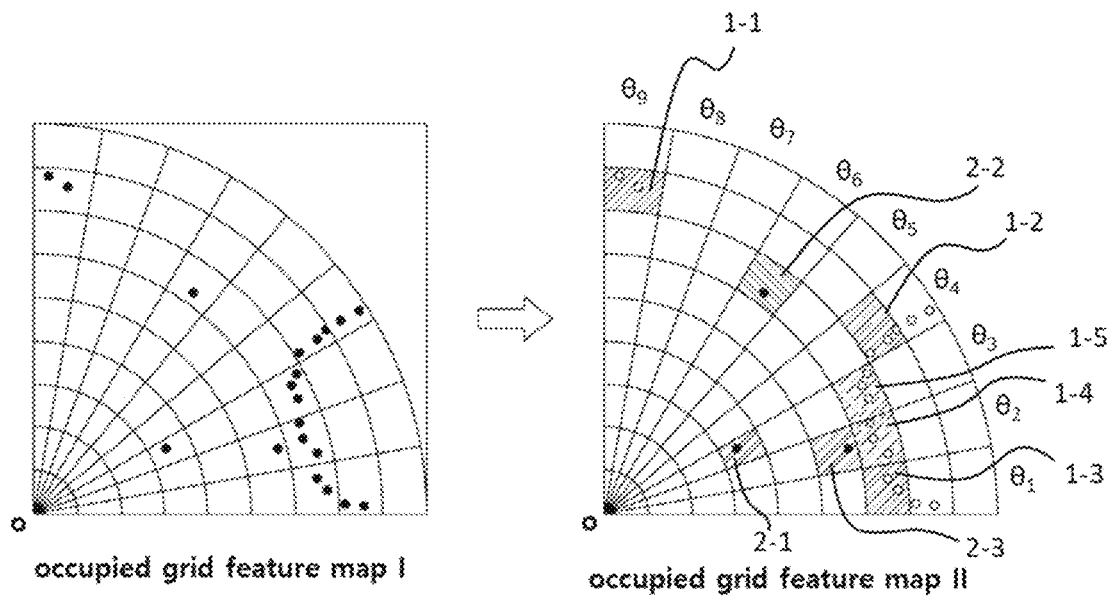
FIG. 9 is a result of implementation of the grid level noise filtering step.

FIG. 9 is an exemplary result of implementation of the grid level noise filtering step.

Referring to FIG. 9, the grid map includes 9 angle sections, each section including 9 grids. First, the grids 1-3, 2-3, 2-1, 1-2, 2-2, and 1-1 are selected as free space reference grids for the respective angle sections $\theta_1$, $\theta_2$, $\theta_3$, $\theta_4$, $\theta_6$, $\theta_9$ because the selected grids contain the respective points having the smallest distance from the origin O. Next, the grids 2-3, 2-1, and 2-2 are removed from the map (for example, to this end, the designations of the FS reference grids to the grids 2-3, 2-1, and 2-2 may be cancelled and the points in the grids may be deleted), and the grids 1-4 and 1-5 are selected as respective new free space reference grids for the corresponding sections $\theta_2$ and $\theta_3$. Removing the grids 2-3, 2-1, and 2-2 is expected to give some damage to accuracy of point cloud data analysis, however, experientially, the case where there is only one point in a grid indicates noise rather than a real object in many cases. Therefore, removing the grids hardly has an effect on the actual accuracy.

Figure 10:
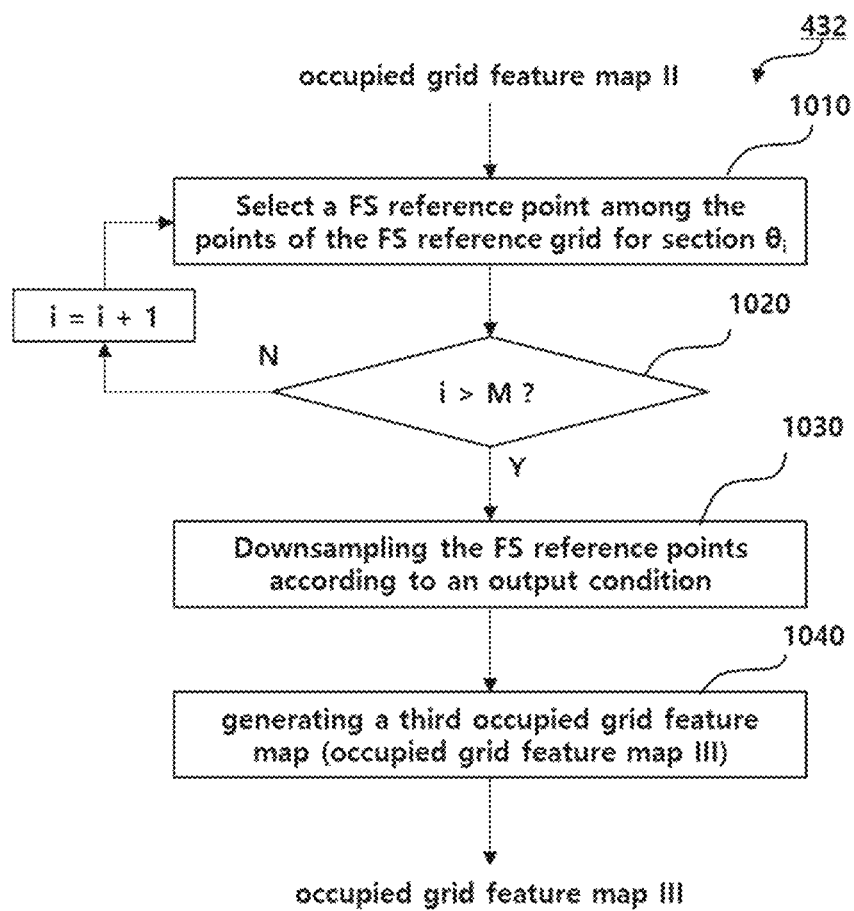
FIG. 10 is an embodiment of a grid level downsampling step.

FIG. 10 is an exemplary embodiment of the grid level downsampling step.

Figure 11:
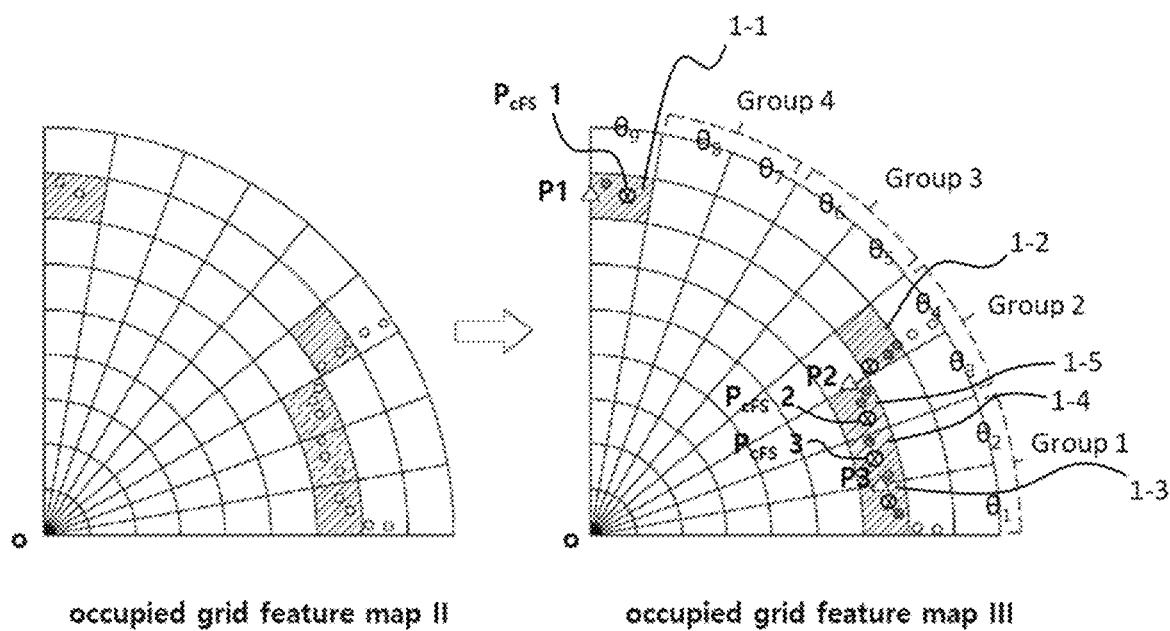
FIG. 11 is a result of implementation of the grid level downsampling step.

Referring to FIG. 10, the grid level downsampling step 432 includes step 1010 of selecting a closest point from the origin among the points of the free space (FS) reference grid for the corresponding section $\theta_i$ as a FS reference point for the section (the step 1010 is repeated until the selection of the FS reference point is completed for all the M sections), step 1030 of downsampling the FS reference points according to an output condition, e.g. a resolution condition determined by an output specification for the received second occupied grid feature map (occupied grid feature map II), and step 1040 of generating a third occupied grid feature map (occupied grid feature map III) with the downsampled FS reference points. The step 1030, for example, may include grouping the angle sections by a predetermined number of adjacent sections, and determining representative FS points for respective groups, each representative FS point determined as having the same distance from the origin as the one of the closest FS reference point and an average angle of the FS reference grids for the corresponding group. FIG. 11 is an exemplary result of implementation of the grid level downsampling step.

Referring to FIG. 11, when the grid level downsampling step 432 is performed, a point closest to the origin among points included in each of the FS reference grids 1-1 to 1-5 is determined as a FS reference point ($\widehat{x}$). FIG. 11 is for an exemplary case where a grid resolution according to an output specification is twice as large in angle span as the grid resolution of the second occupied grid feature map (occupied grid feature map II). The sections $\theta_1$ and $\theta_2$ are grouped in group 1, the sections $\theta_3$ and $\theta_4$ are grouped in group 2, the sections $\theta_5$ and $\theta_6$ are grouped in group 3, the sections $\theta_7$ and $\theta_8$ are grouped in group 4, and the remaining sections, which are not shown in FIG. 11, are grouped in the same way. The point P1 is the representative FS point for the group 5 (partially shown), the point P2 is the representative FS point for the group 2, and the point P3 is the representative FS point for the group 1. The representative FS point P1 has the same distance from the origin O as the one of the closest FS reference point 1 ($P_{cFS}1$) and is located at the average angle of the sections $\theta_9$ and $\theta_{10}$ (the section $\theta_{10}$ is not shown). Also, the representative FS point P2 has the same distance from the origin O as the one of the closest FS reference point 2 (Pas 2) and is located at the average angle of the sections $\theta_3$ and $\theta_4$. Likewise, the representative FS point P3 has the same distance from the origin O as the one of the closest FS reference point 3 (Pas 3) and is located at the average angle of the sections $\theta_5$ and $\theta_6$.

Figure 12:
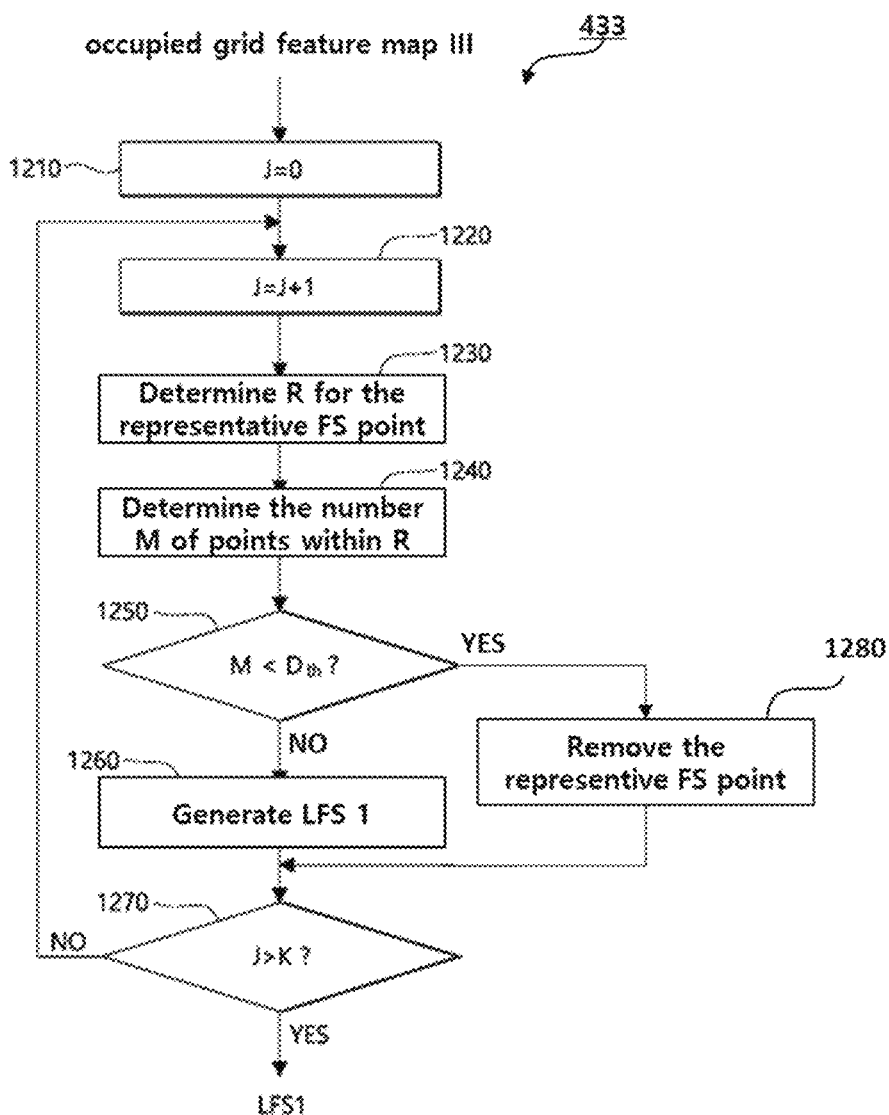
FIG. 12 is an embodiment of a point level noise filtering step.

FIG. 12 is an exemplary embodiment of the point level noise filtering step.

Referring to FIG. 12, the point level noise filtering step 433 includes step 1230 of determining a radius R corresponding to each representative FS point in the third occupied grid feature map (occupied grid feature map III), step 1240 of determining the number M of points (e.g., representative FS points) located within the radius R as an indication of the density for the corresponding representative FS point, step 1250 of comparing the number M with a preset reference density ($D_{th}$), and step 1260 of generating first LiDAR free space data (LFS1) with the representative FS points having a density higher than or equal to the preset reference density ($D_{th}$). Representative FS points which have a density lower than the preset reference density ($D_{th}$) are removed in step 1280.

Figure 13:
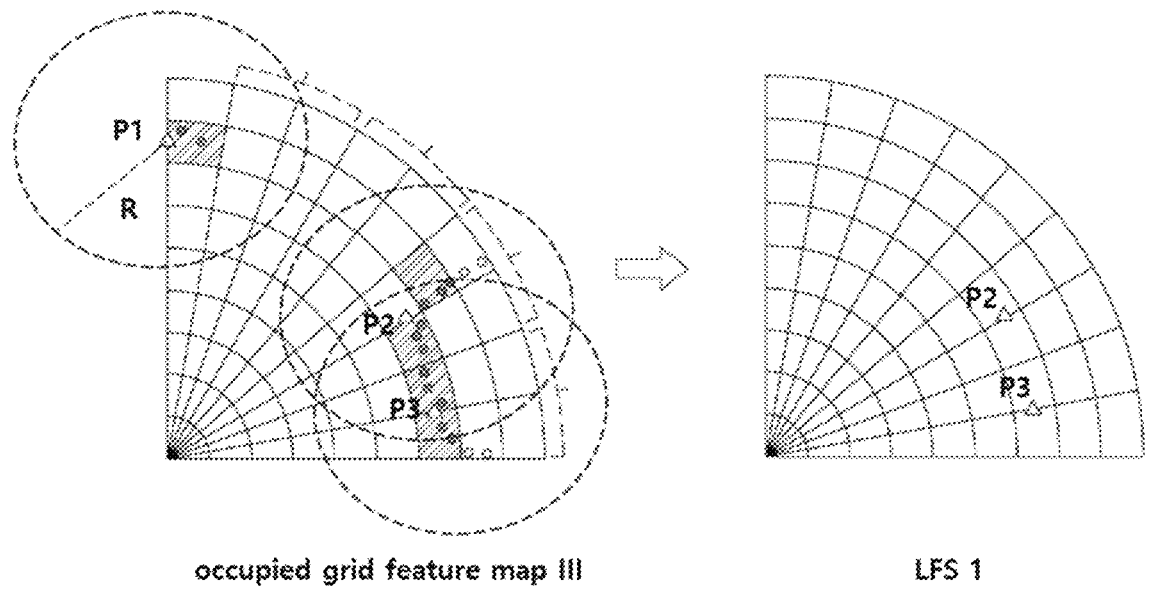
FIG. 13 is a result of implementation of the point level noise filtering step.

FIG. 13 is an exemplary result of implementation of the point level noise filtering step.

Referring to FIG. 13, in step 1240 of determining the number M of points (M being a natural number) within the radius R, when the number of points present within the radius R is fewer than the preset number L (L being a natural number), the representative FS points are treated as noise.

Within the radius R of the representative FS point P1, there is no representative FS point other than the representative FS point P1 itself, and thus the representative FS point P1 is treated as noise and removed. Within each of the radii of the two representative FS points P2 and P3, two representative FS points including each of the two representative FS points P2 and P3 are present, and thus the two representative FS points P2 and P3 are included in the first LiDAR free space data (LFS1).

Here, the radius R, the number M of points, and the reference density $D_{th}$ may be determined by optimization based on actual data.

Figure 14:
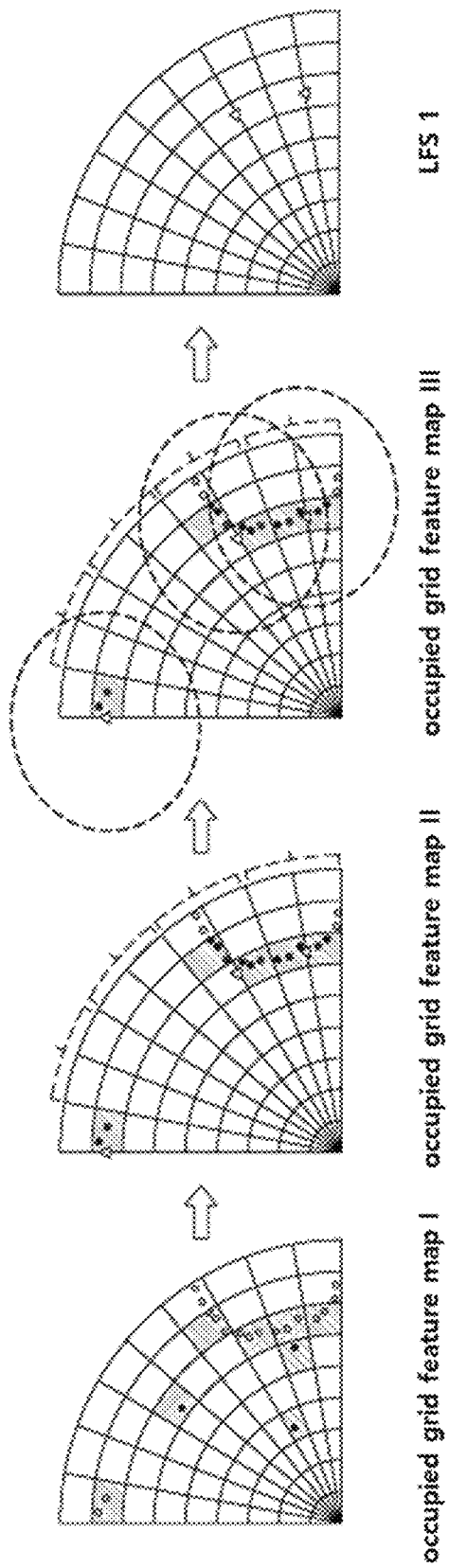
FIG. 14 continuously illustrates results of a multi-modal noise filtering step.

FIG. 14 continuously illustrates exemplary results of the multi-modal noise filtering step.

Referring to FIG. 14, it is possible to understand a process of finally generating the first LiDAR free space data (LFS1) by performing the multi-modal noise filtering process on the first occupied grid feature map (occupied grid feature map I).

Figure 15:
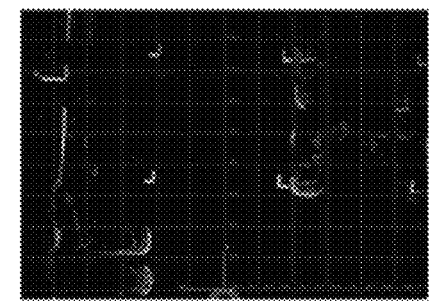
FIG. 15 compares a point cloud received from LiDAR, an image of a camera, LiDAR-based input data before application of an embodiment of the present invention, and LiDAR-based input data after application of an embodiment of the present invention.
Figure 15:
Figure 15:
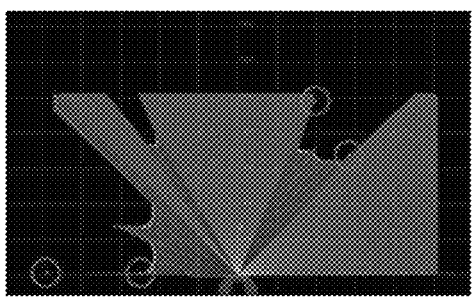
Figure 15:
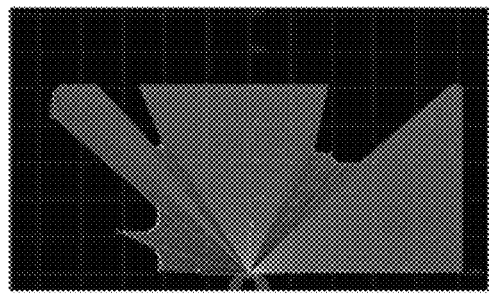

FIG. 15 compares a point cloud received from LiDAR for an exemplary actual environment, an image of a camera for the environment, LiDAR-based input data before application of an embodiment of the present invention, and LiDAR-based input data after application of an embodiment of the present invention.

Referring to FIG. 15, it can be seen that, while the LiDAR-based input data before application of an embodiment of the present invention includes noise indicated by four circles, the LiDAR-based input data after application of an embodiment of the present invention does not include the noise.

The LiDAR free space data generator and the LiDAR signal processing method using the multi-modal noise filtering scheme according to an embodiment of the present invention described above have advantages in that it is possible to improve ability to recognize a parking space of a short-distance autonomous parking system since unnecessary noise that may be included in LiDAR input data is effectively removed.

The effects obtainable by an embodiment of the present invention are not limited to the above-mentioned effects, and other effects not mentioned herein may be clearly understood by those of ordinary skill in the art to which the present invention belongs from the above description.

The embodiments of the present invention described above may be implemented as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc.

It will be apparent to those skilled in the art that various modifications and variations can be made in embodiments of the present invention without departing from the spirit or scope of the invention. Thus, it is intended that the present invention cover the modifications and variations of this invention provided they come within the scope of the appended claims and their equivalents.

What is claimed is:

1. A LiDAR free space data generator comprising:
a point filter module configured to select input points in a region of interest of an autonomous parking system from a three-dimensional (3D) point cloud obtained from a LiDAR;
a two-dimensional (2D) grid map generation module configured to perform 2D grid-wise point processing on the selected input points to generate a first occupied grid feature map; and
a multi-modal noise filter module configured to perform grid-level downsampling on the first occupied grid feature map to generate first LiDAR free space data,
wherein the grid-level downsampling includes grouping sections of the first occupied grid feature map by a predetermined number, each of the sections being defined as including grids along a predetermined direction at a predetermined location.

2. The LiDAR free space data generator according to claim 1, wherein:
the point filter module is configured to select, as the input points, points within a range between a first height and a second height from a ground level, and
the range is part of the region of interest.

3. The LiDAR free space data generator according to claim 1, wherein each grid of a plurality of grids that contains one or more points in the first occupied grid feature map includes information of a number of points contained therein, a maximum height and a minimum height of the contained points, or a distance from an origin to a point closest to the origin.

4. The LiDAR free space data generator according to claim 1,
wherein each grid of a plurality of grids that contains one or more points in the first occupied grid feature map includes information of a number of points contained therein, a maximum height and a minimum height of the contained points, and a distance from an origin to a point closest to the origin.

5. A LiDAR free space data generator comprising:
a point filter module configured to select input points in a region of interest of an autonomous parking system from a three-dimensional (3D) point cloud obtained from a LiDAR;
a two-dimensional (2D) grid map generation module configured to perform 2D grid-wise point processing on the selected input points to generate a first occupied grid feature map; and
a multi-modal noise filter module configured to perform grid-level noise filtering, grid-level downsampling, or point-level noise filtering on the first occupied grid feature map to generate first LiDAR free space data,
wherein the multi-modal noise filter module comprises:
a grid level noise filtering unit configured to remove a point of a grid having only the point therein and determine a free space reference grid for each angle section of a first plurality of angle sections in the first occupied grid feature map to generate a second occupied grid feature map;
a grid level downsampling unit configured to determine a representative free space point for each group of angle sections of a second plurality of angle sections in the second occupied grid feature map to generate a third occupied grid feature map; and
a point level noise filtering unit configured to generate the first LiDAR free space data including one of the representative free space points after removing another of the representative free space points that has a density lower than a preset reference density in the third occupied grid feature map.

6. The LiDAR free space data generator according to claim 1, further comprising a preprocessing unit configured to:
  perform calibration for causing coordinates of the LiDAR to coincide with coordinates of a vehicle on data of the 3D point cloud to transform the data of the 3D point cloud in accordance with a reference coordinate system according to a position and an angle of the LiDAR when the LiDAR is mounted on the vehicle; and
  remove a point having low signal strength or reflectance and data reflected by the vehicle from the data of the 3D point cloud.

7. A LiDAR signal processing method using a multi-modal noise filtering scheme for removing noise included in data of a three-dimensional (3D) point cloud, the LiDAR signal processing method comprising:
  generating a first occupied grid feature map by selecting, as input points, points within a range between a first height and a second height from a ground level in a region of interest of an autonomous parking system in the point cloud;
  performing two-dimensional (2D) grid-wise point processing on the selected input points; and
  generating first LiDAR free space data by performing a grid-level downsampling on the first occupied grid feature map,
  wherein the grid-level downsampling includes grouping sections of the first occupied grid feature map by a predetermined number, each of the sections being defined as including grids along a predetermined direction at a predetermined location.

8. The LiDAR signal processing method according to claim 7, wherein each grid of a plurality of grids that contain one or more points in the first occupied grid feature map includes information of a number of points contained therein, a maximum height and a minimum height of the contained points, or a distance from an origin to a point closest to the origin.

9. The LiDAR signal processing method according to claim 7, wherein each grid of a plurality of grids that contain one or more points in the first occupied grid feature map includes information of a number of points contained therein, a maximum height and a minimum height of the contained points, and a distance from an origin to a point closest to the origin.

10. A LiDAR signal processing method using a multi-modal noise filtering scheme for removing noise included in data of a three-dimensional (3D) point cloud, the LiDAR signal processing method comprising:
  generating a first occupied grid feature map by selecting, as input points, points within a range between a first height and a second height from a ground level in a region of interest of an autonomous parking system in the point cloud;
  performing two-dimensional (2D) grid-wise point processing on the selected input points; and
  generating first LiDAR free space data by performing a grid level noise filtering, a grid level downsampling, or a point level noise filtering on the first occupied grid feature map,
  wherein generating the first LiDAR free space data comprises:
    generating a second occupied grid feature map by performing the grid level noise filtering on the first occupied grid feature map;
    generating a third occupied grid feature map by performing the grid level downsampling on the second occupied grid feature map; and
    generating the first LiDAR free space data by performing the point level noise filtering on the third occupied grid feature map.

11. The LiDAR signal processing method according to claim 10, wherein:
  generating the second occupied grid feature map comprises removing a grid having only one point therein among grids included in the first occupied grid feature map;
  generating the third occupied grid feature map comprises determining a representative free space point for each group of angle sections in the second occupied grid feature map; and
  generating the first LiDAR free space data comprises generating the first LiDAR free space data including one of the representative free space points after removing another of the representative free space points that has a density lower than a preset reference density in the third occupied grid feature map.

12. The LiDAR signal processing method according to claim 7, further comprising performing preprocessing to perform calibration for causing coordinates of a LiDAR to coincide with coordinates of a vehicle on the data of the 3D point cloud to transform the data of the 3D point cloud in accordance with a reference coordinate system according to a position and an angle of the LiDAR when the LiDAR is mounted on the vehicle and to remove a point having low signal strength or reflectance and data reflected by the vehicle from the data of the 3D point cloud.

13. A vehicle comprising:
  a LiDAR; and
  a LiDAR free space data generator configured to:
    select input points in a region of interest of an autonomous parking system from a three-dimensional (3D) point cloud obtained from the LiDAR;
    perform two-dimensional (2D) grid-wise point processing on the selected input points to generate a first occupied grid feature map; and
    perform grid-level downsampling, on the first occupied grid feature map to generate first LiDAR free space data,
  wherein the grid-level downsampling includes grouping sections of the first occupied grid feature map by a predetermined number, each of the sections being defined as including grids along a predetermined direction at a predetermined location.

14. The vehicle according to claim 13, wherein:
  the LiDAR free space data generator is configured to select, as the input points, points within a range between a first height and a second height from a ground level, and
  the range is part of the region of interest.

15. The vehicle according to claim 13, wherein each grid of a plurality of grids that contains one or more points in the first occupied grid feature map includes information of a number of points contained therein, a maximum height and a minimum height of the contained points, or a distance from an origin to a point closest to the origin.

16. The vehicle according to claim 13, wherein each grid of a plurality of grids that contains one or more points in the first occupied grid feature map includes information of a number of points contained therein, a maximum height and a minimum height of the contained points, and a distance from an origin to a point closest to the origin.

17. A vehicle comprising:
a LiDAR; and
a LiDAR free space data generator configured to:
- select input points in a region of interest of an autonomous parking system from a three-dimensional (3D) point cloud obtained by from the LiDAR;
- perform two-dimensional (2D) grid-wise point processing on the selected input points to generate a first occupied grid feature map; and
- perform grid-level noise filtering, grid-level downsampling, or point-level noise filtering on the first occupied grid feature map to generate first LiDAR free space data, wherein the LiDAR free space data generator is further configured to remove a point of a grid having only the point therein and determine a free space reference grid for each angle section of a first plurality of angle sections in the first occupied grid feature map to generate a second occupied grid feature map.

18. The vehicle according to claim 17, wherein the LiDAR free space data generator is configured to determine a representative free space point for each group of angle sections of a second plurality of angle sections in the second occupied grid feature map to generate a third occupied grid feature map.

19. The vehicle according to claim 18, wherein the LiDAR free space data generator is further configured to generate the first LiDAR free space data including one of the representative free space points after removing another of the representative free space points that has a density lower than a preset reference density in the third occupied grid feature map.

20. The vehicle according to claim 13, wherein the LiDAR free space data generator is further configured to:
- perform calibration for causing coordinates of the LiDAR to coincide with coordinates of the vehicle on data of the 3D point cloud to transform the data of the 3D point cloud in accordance with a reference coordinate system according to a position and an angle of the LiDAR when the LiDAR is mounted on the vehicle; and
- remove a point having low signal strength or reflectance and data reflected by the vehicle from the data of the 3D point cloud.

* * * * *